(12) United States Patent
Byun (10) Patent No.: US 11,954,351 B2
(45) Date of Patent: Apr. 9, 2024

(54) MEMORY SYSTEM, OPERATING METHOD THEREOF, AND DATA PROCESSING SYSTEM FOR PROCESSING DUPLICATE DATA

(71) Applicant: SK hynix Inc., Icheon-si (KR)

(72) Inventor: Eu Joon Byun, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 53 days.

(21) Appl. No.: 17/728,739

(22) Filed: Apr. 25, 2022

(65) Prior Publication Data

US 2023/0153004 A1 May 18, 2023

(30) Foreign Application Priority Data

Nov. 12, 2021 (KR) ........................ 10-2021-0155867

(51) Int. Cl.
*G06F 3/06* (2006.01)
*G06F 12/02* (2006.01)

(52) U.S. Cl.
CPC .......... *G06F 3/0641* (2013.01); *G06F 3/0605* (2013.01); *G06F 3/0659* (2013.01); *G06F 3/0679* (2013.01); *G06F 12/0238* (2013.01); *G06F 2212/7201* (2013.01)

(58) Field of Classification Search
CPC ...... G06F 3/0605; G06F 3/061; G06F 3/0619; G06F 3/064; G06F 3/0641; G06F 3/065; G06F 3/0659; G06F 3/0679; G06F 12/0238; G06F 12/0246; G06F 2212/1041; G06F 2212/7201; G06F 2212/7205

See application file for complete search history.

(56) References Cited

U.S. PATENT DOCUMENTS

| | | | |
|---|---|---|---|
| 6,374,266 B1 * | 4/2002 | Shnelvar | G06F 11/1453 |
| 2010/0223495 A1 * | 9/2010 | Leppard | G06F 11/004 |
| | | | 711/E12.001 |
| 2013/0159644 A1 * | 6/2013 | Lee | G11B 20/1803 |
| | | | 711/E12.103 |
| 2019/0362081 A1 * | 11/2019 | Kanno | G06F 12/1408 |

FOREIGN PATENT DOCUMENTS

| | | |
|---|---|---|
| KR | 20180034842 A | 4/2018 |
| KR | 20180058169 A | 5/2018 |

* cited by examiner

*Primary Examiner* — Larry T Mackall
(74) *Attorney, Agent, or Firm* — Perkins Coie LLP (57) ABSTRACT

A memory system may include: a nonvolatile memory device comprising a plurality of memory regions; and a controller in communication with the nonvolatile memory device to control operations of the nonvolatile memory device and configured to: receive a first write request including a first logical address and a second logical address; determine a duplicate physical address mapped to the second logical address; and selectively map the first logical address to the duplicate physical address based on a duplicate count corresponding to the duplicate physical address.

20 Claims, 10 Drawing Sheets

MEMORY SYSTEM, OPERATING METHOD THEREOF, AND DATA PROCESSING SYSTEM FOR PROCESSING DUPLICATE DATA

PRIORITY CLAIM AND CROSS-REFERENCES TO RELATED APPLICATION

This patent application document claims the priority and benefits of Korean application number 10-2021-0155867, filed on Nov. 12, 2021, which is incorporated herein by reference in its entirety as part of the disclosure of this patent application document.

TECHNICAL FIELD

Various embodiments generally relate to a memory system and a data processing system, and more particularly, to a memory system including a nonvolatile memory device, and a data processing system.

BACKGROUND

Memory systems are used to store information for use in a computer or other electronic devices. Memory systems may store data provided from a host device in response to a write request of the host device and provide data stored therein to the host device in response to a read request of the host device. The host device can be any electric device that writes or reads data to or from a memory system, such as a computer, a digital camera, a mobile phone and others. The memory system may be electrically connected to the host device or may be in communication with the host device.

SUMMARY

The technology disclosed in this patent document can be implemented in various embodiments to provide memory system, operating methods, and data processing systems for efficiently managing duplicate data.

In an embodiment, a memory system may include: a nonvolatile memory device comprising a plurality of memory regions; and a controller in communication with the nonvolatile memory device to control operations of the nonvolatile memory device and configured to: receive a first write request including a first logical address and a second logical address; determine a duplicate physical address mapped to the second logical address; and selectively map the first logical address to the duplicate physical address based on a duplicate count corresponding to the duplicate physical address.

In an embodiment, an operating method of a memory system may include: receiving a first write request including a first logical address and a second logical address; determining a duplicate physical address mapped to the second logical address, in response to the first write request; and determining whether to map the first logical address to the duplicate physical address based on a duplicate count corresponding to the duplicate physical address.

In an embodiment, a data processing system may include: a host device configured to generate a first write request including a current logical address and a duplicate logical address; and a memory system in communication with the host device to perform a memory operation in response to a request from the host device, the memory system configured to receive the first write request from the host device, determine a duplicate physical address mapped to the duplicate logical address, and selectively map the current logical address to the duplicate physical address based on a duplicate count corresponding to the duplicate physical address.

In an embodiment, a memory system may include: a nonvolatile memory device comprising a plurality of memory regions; and a controller configured to determine a duplicate physical address mapped to a second logical address in response to a first write request including a first logical address and the second logical address, and selectively map the first logical address to the duplicate physical address according to a result obtained by referring to a duplicate count corresponding to the duplicate physical address.

In an embodiment, an operating method of a memory system may include the steps of: receiving a first write request including a first logical address and a second logical address; deciding a duplicate physical address mapped to the second logical address, in response to the first write request; and deciding whether to map the first logical address to the duplicate physical address, according to a result obtained by referring to a duplicate count corresponding to the duplicate physical address.

In an embodiment, a data processing system may include: a host device configured to generate a first write request including a current logical address and a duplicate logical address; and a memory system configured to receive the first write request from the host device, determine a duplicate physical address mapped to the duplicate logical address, and selectively map the current logical address to the duplicate physical address according to a result obtained by referring to a duplicate count corresponding to the duplicate physical address.

In an embodiment, a memory system may include: a nonvolatile memory device comprising a plurality of memory regions configured to store data in one or more physical addresses of the memory regions by mapping one or more logical addresses to the one or more physical addresses; and a controller in communication with the nonvolatile memory device to control operations of the nonvolatile memory device and configured to: receive a first write request including a first logical address and a second logical address; determine a duplicate physical address mapped to the second logical address, wherein the duplicate physical address corresponds to a memory region in which duplicate data is stored; and selectively map the first logical address to the duplicate physical address based on a duplicate count corresponding to the duplicate physical address, wherein the duplicate count indicates a number of duplicate physical addresses that store duplicate data.

In an embodiment, an operating method of a memory system may include: receiving a first write request including a first logical address and a second logical address; determining a duplicate physical address mapped to the second logical address, in response to the first write request, wherein the duplicate physical address corresponds to a memory region in which duplicate data is stored; and determining whether to map the first logical address to the duplicate physical address based on a duplicate count corresponding to the duplicate physical address, wherein the duplicate count indicates a number of duplicate physical addresses that store duplicate data.

In an embodiment, a data processing system may include: a host device configured to generate a first write request including a current logical address and a duplicate logical address; and a memory system in communication with the host device to perform a memory operation in response to a request from the host device, the memory system configured to receive the first write request from the host device, determine a duplicate physical address mapped to the duplicate logical address, wherein the duplicate physical address and the duplicate logical address correspond to a memory region in which duplicate data is stored, and selectively map the current logical address to the duplicate physical address based on a duplicate count corresponding to the duplicate physical address, wherein the duplicate count indicates a number of duplicate physical addresses that store duplicate data.

DETAILED DESCRIPTION

The technology disclosed in this patent document can be implemented in some embodiments to provide a memory system that can efficiently manage its memory space by reducing duplicate data.

Hereafter, some embodiments of the disclosed technology will be described in detail with reference to the drawings.

Figure 1:
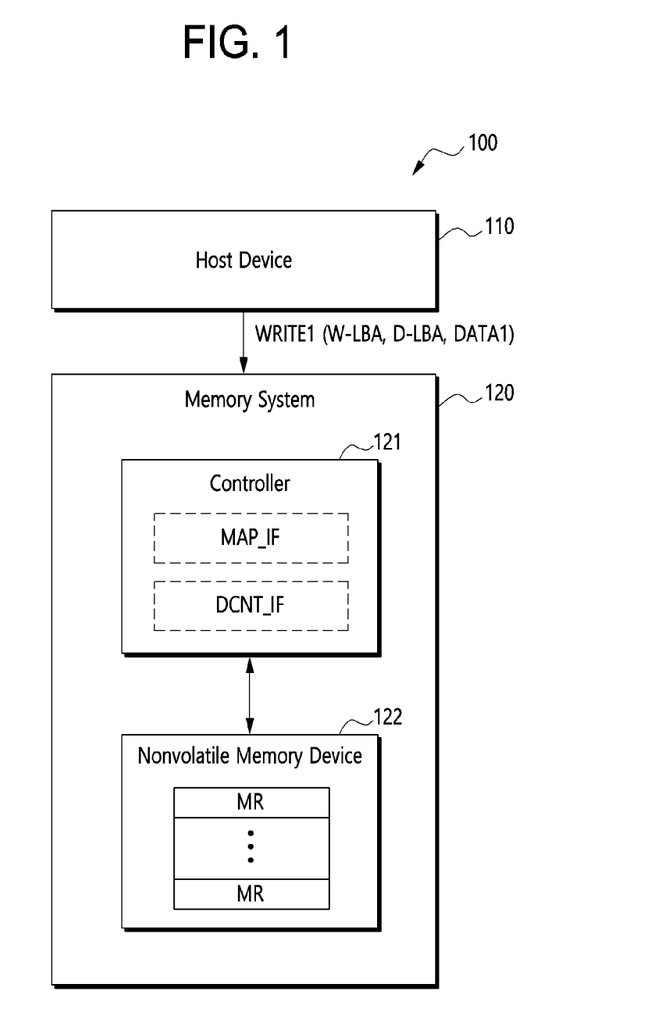
FIG. 1 is a block diagram illustrating an example of a data processing system based on some embodiments of the disclosed technology.

FIG. 1 is a block diagram illustrating an example of a data processing system 100 based on some embodiments of the disclosed technology.

A memory system may be in a host device or remotely in communication with the host device. In some implementations, the data processing system 100 may include a host device 110 and a memory system 120.

In some implementations, the host device 110 may include an electric device capable of processing data, and examples thereof may include a computer, a digital camera, a mobile phone and others. The host device 110 may store data in the memory system 120 and read data from the memory system 120. In some implementations, the host device 110 may generate a first write request WRITE1 including a first logical address, e.g., a current logical address W-LBA, and a second logical address, e.g., a duplicate logical address D-LBA, and transmit the first write request WIRTE1 to the memory system 120.

In an embodiment, the host device 110 may generate the first write request WRITE1 for first data DATA1, when copying the first data DATA1. The duplicate logical address D-LBA may be a logical address originally or previously allocated to the first data DATA1, and the current logical address W-LBA may be an address newly allocated to the copied first data DATA1. At this time, it may be determined that both of the current logical address W-LBA and the duplicate logical address D-LBA are validly allocated to the first data DATA1.

Examples of the memory system 120 may include a PCMCIA (Personal Computer Memory Card International Association) card, CF (Compact Flash) card, smart media card, memory stick, various multimedia cards (MMC, eMMC, RS-MMC and MMC-micro), SD (Secure Digital) card (SD, Mini-SD, Micro-SD), UFS (Universal Flash Storage), SSD (Solid State Drive) and others.

The memory system 120 may include a controller 121 and a nonvolatile memory device 122.

The controller 121 may control overall operations of the memory system 120. The controller 121 may control the nonvolatile memory device 122 to perform a foreground operation according to an instruction of the host device 110. The foreground operation may include an operation of writing data to the nonvolatile memory device 122 and reading data from the nonvolatile memory device 122, according to a write request and read request of the host device 110.

Furthermore, the controller 121 may control the nonvolatile memory device 122 to perform a background operation which is performed internally without any request from the host device 110. The background operation may include one or more of a wear-leveling operation, a garbage collection operation, an erase operation, a read reclaim operation and a refresh operation on the nonvolatile memory device 122. The background operation may include writing data to the nonvolatile memory device 122 and reading data from the nonvolatile memory device 122, like the foreground operation.

The controller 121 may receive the first write request WRITE1 from the host device 110. The controller 121 may determine a physical address (hereafter referred to as duplicate physical address) mapped to the duplicate logical address D-LBA in response to the first write request WRITE1, and selectively map the current logical address W-LBA to the duplicate physical address according to a result obtained by referring to a duplicate count corresponding to the duplicate physical address.

Specifically, when the duplicate count corresponding to the duplicate physical address is less than a threshold value, the controller 121 may increase the duplicate count corresponding to the duplicate physical address, and map the current logical address W-LBA to the duplicate physical address. In this case, the controller 121 does not write the first data DATA1 to the nonvolatile memory device 122 in response to the first write request WRITE1.

On the other hand, when the duplicate count corresponding to the duplicate physical address is equal to the threshold value, the controller 121 may write the first data DATA1 corresponding to the first write request WRITE1 to a memory region selected among memory regions MR of the nonvolatile memory device 122, and map the current logical address W-LBA to the physical address of the selected memory region. The host device 110 may transmit the first data DATA1 along with the first write request WRITE1 to the controller 121, and the controller 121 may store the first data DATA1 transmitted from the host device 110 in the selected memory region of the nonvolatile memory device 122. In an embodiment, the first write request WRITE1 may not include the first data DATA1, and the controller 121 may read the first data DATA1 from the memory region corresponding to the duplicate physical address in the nonvolatile memory device 122, and store the read first data DATA1 in the selected memory region.

In an embodiment, the controller 121 may store zero value (0) for the duplicate count corresponding to the physical address of the selected memory area, when storing the first data DATA1 in the selected memory region of the nonvolatile memory device 122.

In an embodiment, the host device 110 may transmit, to the controller 121, a second write request (not illustrated) which includes the current logical address W-LBA but does not include the duplicate logical address D-LBA. The controller 121 may store second data corresponding to the second write request in a memory region selected among the memory regions MR of the nonvolatile memory device 122, in response to the second write request, and map the current logical address W-LBA to the physical address of the selected memory region. In an embodiment, the controller 121 may determine the previous is physical address which has been mapped to the current logical address W-LBA, in response to the second write request. When the duplicate count corresponding to the previous physical address exceeds 0, the controller 121 may decrease the duplicate count corresponding to the previous physical address. In an embodiment, the controller 121 may store zero value (0) for the duplicate count corresponding to the physical address of the selected memory region, when storing the second data DATA2 in the selected memory region.

The controller 121 may refer to address mapping information MAP_IF in order to determine a physical address mapped to a logical address. The address mapping information MAP_IF may include the mapping relationships between logical addresses used by the host device 110 and the physical addresses of the memory regions MR. Furthermore, the controller 121 may refer to a duplicate count corresponding to a physical address, from duplicate count information DCNT_IF. The duplicate count information DCNT_IF may include duplicate counts corresponding to physical addresses, respectively.

The nonvolatile memory device 122 may store data transmitted from the controller 121, and read data stored therein and transmit the read data to the controller 121, under control of the controller 121. The nonvolatile memory device 122 may include a plurality of memory regions MR corresponding to different physical addresses, respectively.

Examples of the nonvolatile memory device 122 may include a flash memory device such as NAND flash or NOR flash, FeRAM (Ferroelectric Random Access Memory), PCRAM (Phase-Change Random Access Memory), MRAM (Magnetic Random Access Memory), ReRAM (Resistive Random Access Memory) and others.

The nonvolatile memory device 122 may include one or more planes, one or more memory chips, one or more memory dies, or one or more memory packages. FIG. 1 illustrates that the memory system 120 includes one nonvolatile memory device 122, but the number of nonvolatile memory devices included in the memory system 120 is not limited thereto.

Figure 2A:
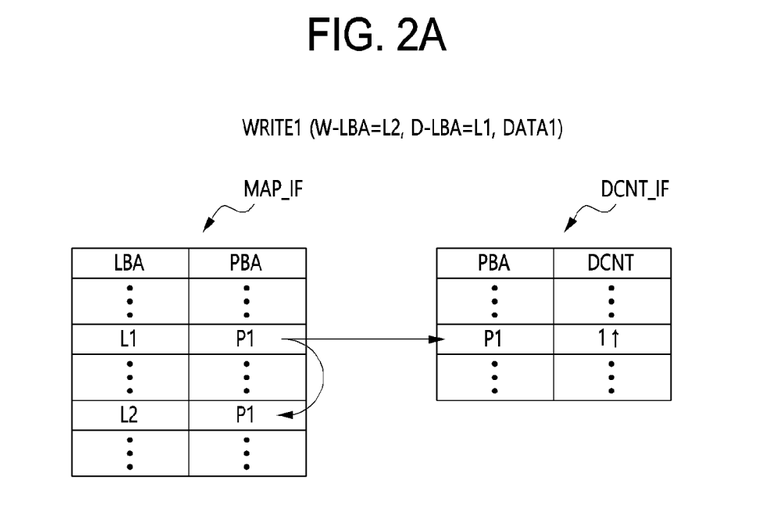
FIGS. 2A and 2B are diagrams illustrating an example of an operating method of a controller based on some embodiments of the disclosed technology.

FIG. 2A is a diagram illustrating an operating method of the controller 121 based on some embodiments of the disclosed technology.

Referring to FIG. 2A, the host device 110 may transmit the first write request WRITE1 to the controller 121. The first write request WRITE1 may include a current logical address W-LBA (e.g., L2), a duplicate logical address D-LBA (e.g., L1), and first data DATA1. When copying the first data DATA1, the host device 110 may transmit, to the controller 121, the first write request WRITE1 including the duplicate logical address D-LBA as well as the current logical address W-LBA. The duplicate logical address D-LBA may be a logical address originally or previously allocated to the existing first data DATA1, and the current logical address W-LBA may be a logical address newly allocated to the copied first data DATA1. Therefore, the first data DATA1 included in the first write request WRITE1 may be duplicate data. The duplicate data may indicate the same data allocated to two or more different logical addresses.

In some implementations, the controller 121 may receive the first write request WRITE1, and update the address mapping information MAP_IF and the duplicate count information DCNT_IF on the basis of the first write request WRITE1, if necessary. In one example, the controller 121 may determine a duplicate physical address P1 mapped to the duplicate logical address D-LBA (L1) on the basis of the address mapping information MAP_IF. Furthermore, the controller 121 may update the address mapping information MAP_IF by mapping the current logical address W-LBA (L2) to the duplicate physical address P1. In other words, the controller 121 may update the address mapping information MAP_IF by mapping both the duplicate logical address D-LBA (L1) and the current logical address W-LBA (L2) to the duplicate physical address P1. In some implementations, the controller 121 does not actually write the duplicate data DATA1 to a memory region of the nonvolatile memory device 122 in response to the first write request WRITE1.

Figure 2B:
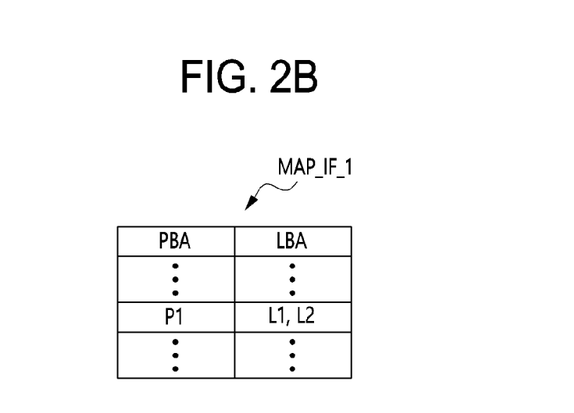

The address mapping information MAP_IF may include a mapping or look-up table having logical addresses LBA as indices, for example. In an embodiment, as illustrated in FIG. 2B, address mapping information MAP_IF_1 may include a table having physical addresses PBA as indices. The address mapping information MAP_IF_1 of FIG. 2B may be configured according to a multi-mapping method, which is used to map one or more logical addresses to each physical address. In the address mapping information MAP_IF_1, the duplicate physical address P1 may be mapped to the duplicate logical address D-LBA (L1) and the current logical address W-LBA (L2) at the same time.

Referring back to FIG. 2A, the controller 121 may update the duplicate count information DCNT_IF by increasing the duplicate count DCNT corresponding to the duplicate physical address P1 by 1. A duplicate count DCNT that is equal to or greater than 1 may indicate that two or more logical addresses are mapped to the duplicate physical address P1. For example, when the duplicate count DCNT is k, it may indicate that (k+1) logical addresses are mapped to the duplicate physical address P1. When the duplicate count DCNT is equal to or greater than 1, it may indicate that duplicate data is stored in the memory region of the duplicate physical address P1.

Figure 3:
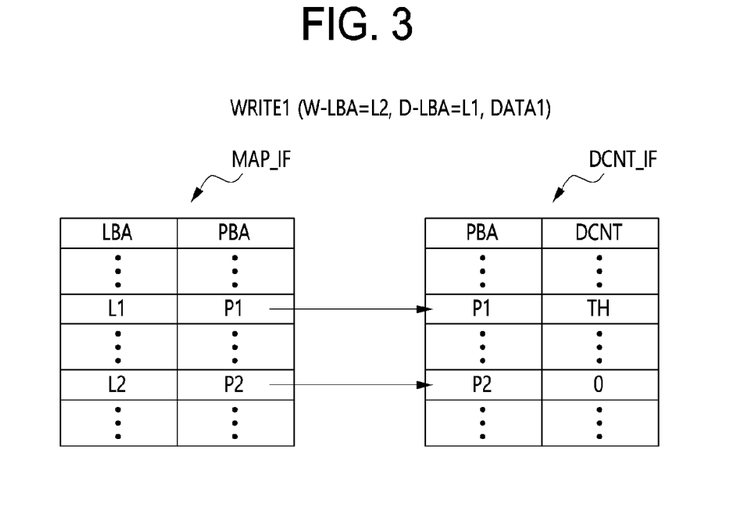
FIG. 3 is a diagram illustrating an example of an operating method of the controller based on some embodiments of the disclosed technology.

FIG. 3 is a diagram illustrating an example of an operating method of the controller 121 based on some embodiments of the disclosed technology. Unlike the method described with reference to FIGS. 2A and 2B, the controller 121 may further determine whether the duplicate count DCNT exceeds a threshold value TH, in response to the first write request WRITE1 for the duplicate data, e.g., the first data DATA1.

In some implementations, referring to FIG. 3, the host device 110 may transmit the first write request WRITE1 to the controller 121. The first write request WRITE1 may include the current logical address is W-LBA (L2), the duplicate logical address D-LBA (L1), and the first data DATA1.

In some implementations, the controller 121 may receive the first write request WRITE1, and update the address mapping information MAP_IF and the duplicate count information DCNT_IF on the basis of the first write request WRITE1, if necessary. In one example, the controller 121 may determine the duplicate physical address P1 mapped to the duplicate logical address D-LBA (L1) on the basis of the address mapping information MAP_IF. The controller 121 may not update the duplicate count information DCNT_IF, when the duplicate count DCNT corresponding to the duplicate physical address P1 is equal to the threshold value TH on the basis of the duplicate count information DCNT_IF. In other words, when the duplicate count DCNT corresponding to the duplicate physical address P1 is equal to the threshold value TH, the duplicate count DCNT corresponding to the duplicate physical address P1 may remain unchanged at the threshold value TH. Furthermore, the controller 121 may store the first data DATA1 in a selected memory region of the nonvolatile memory device 122, and update the address mapping information MAP_IF by mapping the current logical address W-LBA (L2) to a physical address P2 of the selected memory region.

On the other hand, when the duplicate count DCNT corresponding to the duplicate physical address P1 is less than the threshold value TH, the controller 121 may operate as described with reference to FIG. 2A. That is, the controller 121 may perform the operation of mapping the current logical address W-LBA (L2) to the duplicate physical address P1 and does not actually store the duplicate data DATA1 in a memory region of the nonvolatile memory device 122.

The first data DATA1, which is duplicate data, and the first write request WRITE1 may be transmitted as illustrated in FIGS. 2A, 2B and 3. In an embodiment, the first write request WRITE1 may not include the first data DATA1, and the controller 121 may read the first data DATA1 from the memory region corresponding to the duplicate physical address P1, and store the read first data DATA1 in the selected memory region of the nonvolatile memory device 122.

In an embodiment, the controller 121 may update the duplicate count information DCNT_IF by storing zero value (0) for the duplicate count DCNT corresponding to the physical address P2. When the duplicate count DCNT is 0, it may indicate that only one logical address (e.g., L2) is mapped to the physical address P2.

Figure 4A:
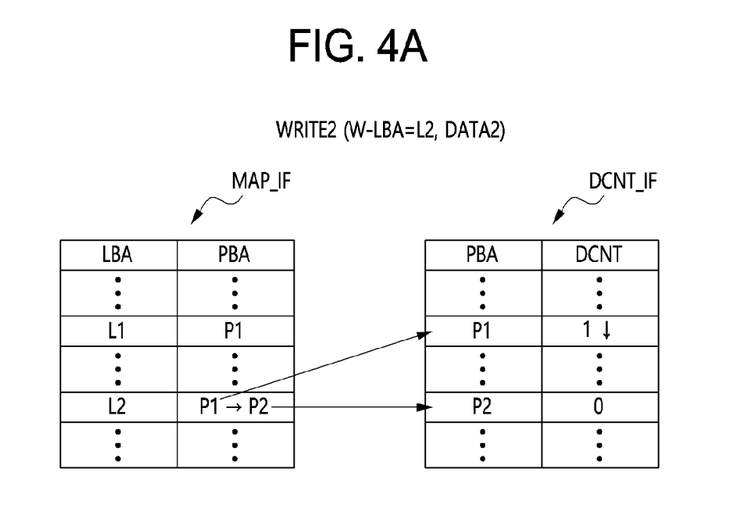
FIGS. 4A and 4B are diagrams illustrating an example of an operating method of the controller based on some embodiments of the disclosed technology.
Figure 4B:
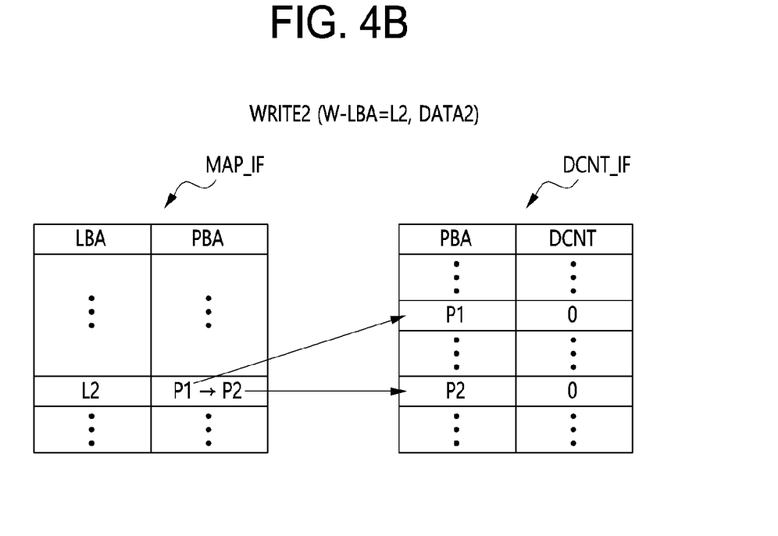

FIGS. 4A and 4B are diagrams illustrating an operating method of the controller 121 based on some embodiments of the disclosed technology.

Referring to FIG. 4A, the host device 110 may transmit a second write request WRITE2 to the controller 121. The second write request WRITE2 may include a current logical address W-LBA (L2) and second data DATA2. For example, the host device 110 may update the second data DATA2 originally or previously allocated to the current logical address W-LBA (L2), and then also allocate the current logical address W-LBA (L2) to the updated second data DATA2. Here, the second write request WRITE2 for the updated second data DATA2 may not include a duplicate logical address D-LBA. When the current logical address W-LBA (L2) is not allocated to any data, the host device 110 may allocate the current logical address W-LBA (L2) to newly generated second data DATA2. Here, the second write request WRITE2 for new data may not include a duplicate logical address D-LBA.

The controller 121 may receive the second write request WRITE2, and update the address mapping information MAP_IF and the duplicate count information DCNT_IF on the basis of the second write request WRITE2, if necessary. In some implementations, the controller 121 may determine the previous physical address P1 mapped to the current logical address W-LBA (L2) on the basis of the address mapping information MAP_IF. The controller 121 may check the duplicate count DCNT corresponding to the previous physical address P1 on the basis of the duplicate count information DCNT_IF. When the duplicate count DCNT is equal to or greater than 1, it may indicate that duplicate data is stored in the memory region of the previous physical address P1. When the duplicate count DCNT is equal to or greater than 1, it may indicate that the previous data of the current logical address W-LBA (L2), e.g., data that is not yet updated to the second data DATA2, is the duplicate data. Therefore, the controller 121 may update the duplicate count information DCNT_IF by decreasing the duplicate count is DCNT by 1. Furthermore, the controller 121 may store the second data DATA2 in the selected memory region, and update the address mapping information MAP_IF by mapping the current logical address W-LBA (L2) to the physical address P2 of the selected memory region.

In an embodiment, the controller 121 may update the duplicate count information DCNT_IF by storing zero value for the duplicate count DCNT corresponding to the physical address P2. That is, when the duplicate count DCNT is 0, it may indicate that only one logical address (e.g., L2) is mapped to the physical address P2. When the duplicate count DCNT is 0, it may indicate that the data stored in the memory region of the physical address P2 is not duplicate data.

FIG. 4B illustrates the duplicate count DCNT corresponding to the previous physical address P1 is 0. When the duplicate count DCNT is 0, it may indicate that data stored in the memory region of the physical address P1 is not duplicate data. Therefore, as described with reference to FIG. 4A, the controller 121 does not need to decrease the duplicate count DCNT corresponding to the previous physical address P1.

As described with reference to FIG. 4A, however, the controller 121 may store the second data DATA2 in the selected memory region, and update the address mapping information MAP_IF by mapping the current logical address W-LBA (L2) to the physical address P2 of the selected memory region. In an embodiment, the controller 121 may update the duplicate count information DCNT_IF by storing, as 0, the duplicate count DCNT corresponding to the physical address P2.

In an embodiment, when the second data DATA2 is not updated data but newly generated data, the current logical address W-LBA (L2) may not be mapped to any physical addresses in the address mapping information MAP_IF. In this case, the operation of referring to the duplicate count information DCNT_IF may be omitted.

In an embodiment, a write request (e.g., the first write request WRITE1) for duplicate data and a write request (e.g., the second write request WRITE2) for updated data (or new data) may be transmitted in different formats. Therefore, the controller 121 may distinguish between the write request for duplicate data and the write request for updated data (or new data), and operate as described with reference to FIGS. 2A, 2B, 3, 4A, and 4B. In an embodiment, the controller 121 may determine whether a write request includes the duplicate logical address D-LBA or not, and thus distinguish between the write request for duplicate data and the write request for updated data (or new data).

In an embodiment, the duplicate count information DCNT_IF may be generated for all physical addresses. In this case, when the duplicate count DCNT corresponding to a certain physical address is 0, it may indicate that data stored in the memory region of the corresponding physical address is not duplicate data. When the duplicate count DCNT corresponding to a certain physical address is 0, it may indicate that the memory region of the corresponding physical address is an empty memory region. When the duplicate count DCNT corresponding to a certain physical address is k, it may indicate that (k+1) logical addresses are mapped to the corresponding physical address.

In an embodiment, the duplicate count information DCNT_IF may be generated for the physical addresses of memory regions in which valid data are stored. In this case, when the duplicate count DCNT corresponding to a certain physical address is 0, it may indicate that data stored in the memory region of the corresponding physical address is not duplicate data. When the duplicate count DCNT corresponding to a certain physical address is k, it may indicate that (k+1) logical addresses are mapped to the corresponding physical address. When invalid data (e.g., previous data of updated data) is stored in the memory region corresponding to a certain physical address, the duplicate count DCNT of the corresponding physical address may be deleted (removed or invalidated) from the duplicate count information DCNT_IF. For example, in FIG. 4B, the previous data of the second data DATA2 is stored in the memory region of the previous physical address P1. Thus, the duplicate count DCNT of the previous physical address P1 may be deleted (removed or invalidated) from the duplicate count information DCNT_IF.

In an embodiment, the duplicate count information DCNT_IF may be generated only for the physical addresses of memory regions in which duplicate data are stored. In this case, the minimum value of the duplicate count DCNT included in the duplicate count information DCNT_IF may be 1. When the duplicate count DCNT corresponding to a certain physical address is k, it may indicate that (k+1) logical addresses are mapped to the corresponding physical address. When duplicate data is no longer stored in a certain physical address included in the duplicate count information DCNT_IF, the duplicate count DCNT of the corresponding physical address may be deleted (removed or invalidated) from the duplicate count information DCNT_IF.

In some embodiments of the disclosed technology, when two or more logical addressees are allocated to store the same duplicate data, the memory system 120 does not store the duplicate data in two or more memory regions. Therefore, the entire volume of valid data is decreased, and thus a management operation of the memory system 120, such as a garbage collection operation including migrating valid data to a new memory region, may be more efficiently performed.

Figure 5:
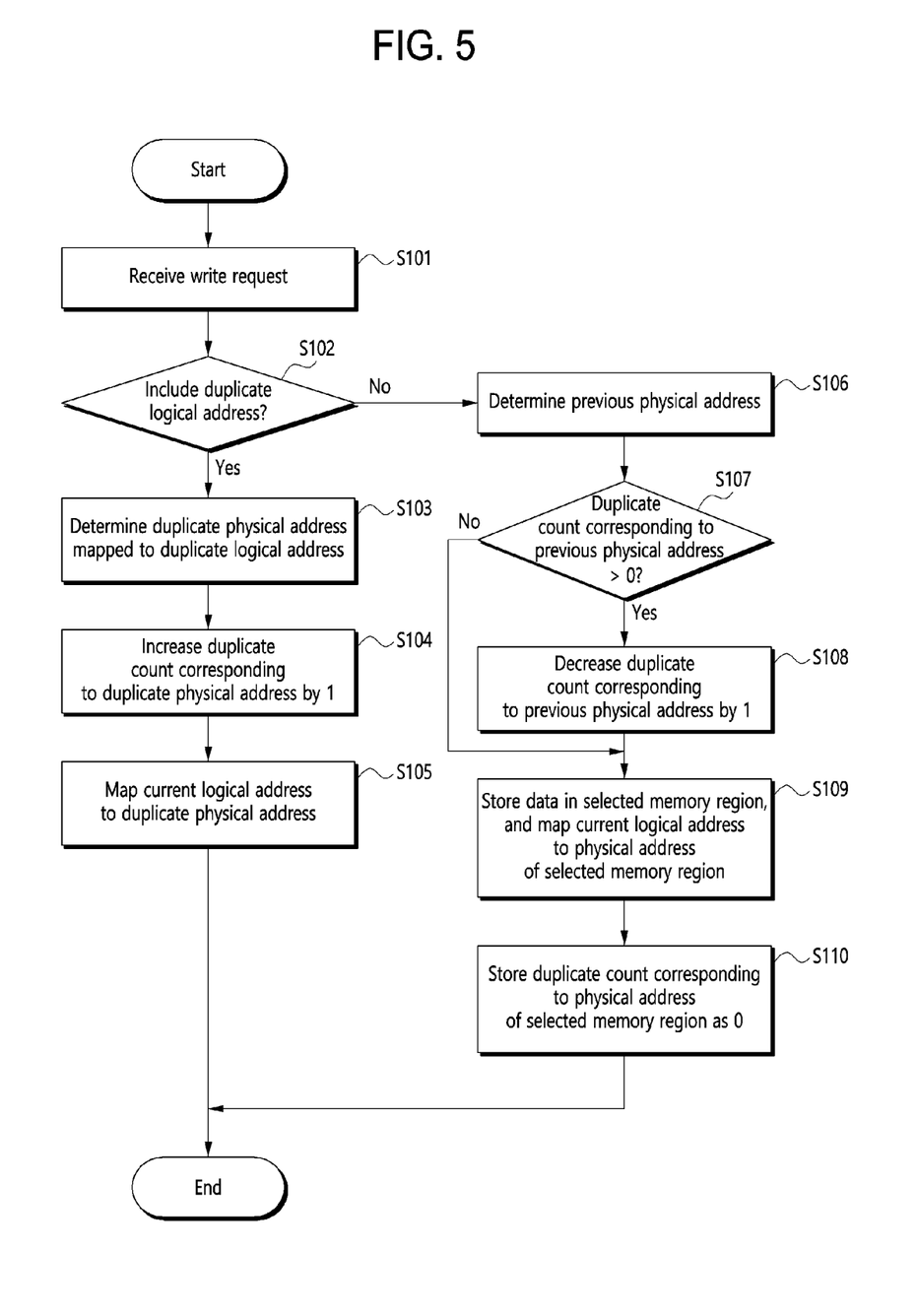
FIG. 5 is a flowchart illustrating an example of an operating method of a memory system based on some embodiments of the disclosed technology.

FIG. 5 is a flowchart illustrating an example of an operating method of the memory system 120 of FIG. 1 based on some embodiments of the disclosed technology. FIG. 5 is based on the assumption that the duplicate count information DCNT_IF is generated for all physical addresses.

Referring to FIG. 5, the controller 121 may receive a write request from the host device 110 at S101.

At S102, the controller 121 may determine whether the write request includes a duplicate logical address D-LBA. When it is determined that the write request includes the duplicate logical address D-LBA, the procedure may proceed to S103. When it is determined that the write request does not include the duplicate logical address D-LBA, the procedure may proceed to S106.

At S103, the controller 121 may determine a duplicate physical address mapped to the duplicate logical address D-LBA on the basis of the address mapping information MAP_IF.

At S104, the controller 121 may increase, by 1, a duplicate count corresponding to the duplicate physical address in the duplicate count information DCNT_IF.

At S105, the controller 121 may update the address mapping information MAP_IF by mapping the current logical address W-LBA to the duplicate physical address.

At S106, the controller 121 may determine a previous physical address mapped to the current logical address W-LBA on the basis of the address mapping information MAP_IF.

At S107, the controller 121 may determine whether the duplicate count corresponding to the previous physical address exceeds 0, on the basis of the duplicate count information DCNT_IF. When it is determined that the duplicate count exceeds 0, the procedure may proceed to step S108. When it is determined that the duplicate count does not exceed 0, the procedure may proceed to step S109.

At S108, the controller 121 may decrease, by 1, the duplicate count corresponding to the previous physical address in the duplicate count information DCNT_IF.

At S109, the controller 121 may store data corresponding to a write request in a selected memory region, and update the address mapping information MAP_IF by mapping the current logical address W-LBA to the physical address of the selected memory region.

At S110, the controller 121 may store, as 0, the duplicate count corresponding to the physical address of the selected memory region in the duplicate count information DCNT_IF.

Figure 6:
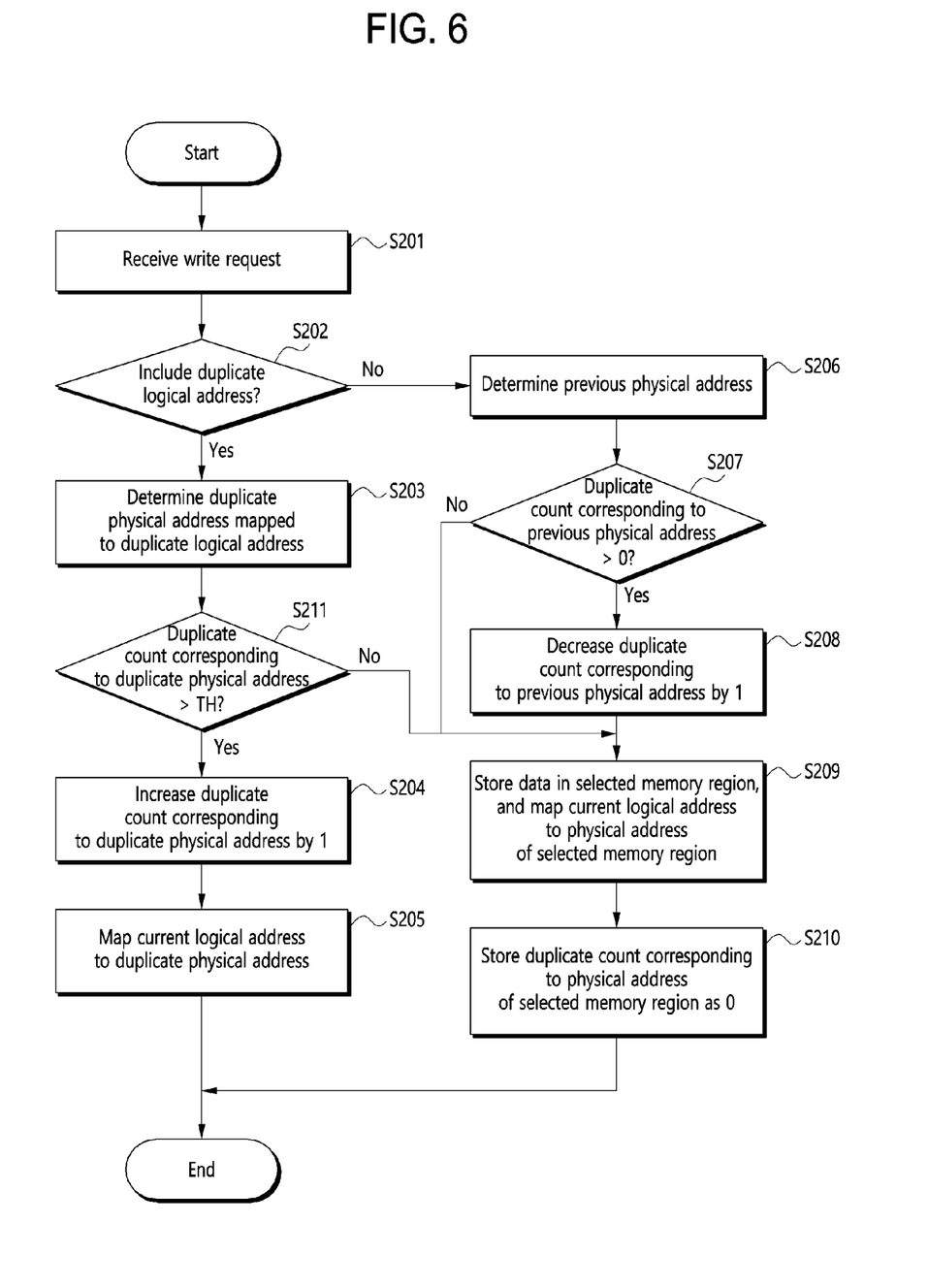
FIG. 6 is a flowchart illustrating an example of an operating method of the memory system based on some embodiments of the disclosed technology.

FIG. 6 is a flowchart illustrating an example of an operating method of the memory system 120 of FIG. 1 based on some embodiments of the disclosed technology.

Operations S201 to S210 shown in FIG. 6 may be performed in a similar manner to operations S101 to S110 shown in FIG. 5. Therefore, the detailed descriptions thereof will be omitted herein.

At S211, the controller 121 may determine whether the duplicate count corresponding to the duplicate physical address is less than a threshold value TH, on the basis of the duplicate count information DCNT_IF. When it is determined that the duplicate count is less than the threshold value TH, the procedure may proceed to S204. When it is determined that the duplicate count is not less than the threshold value TH, the procedure may proceed to S209.

Figure 7:
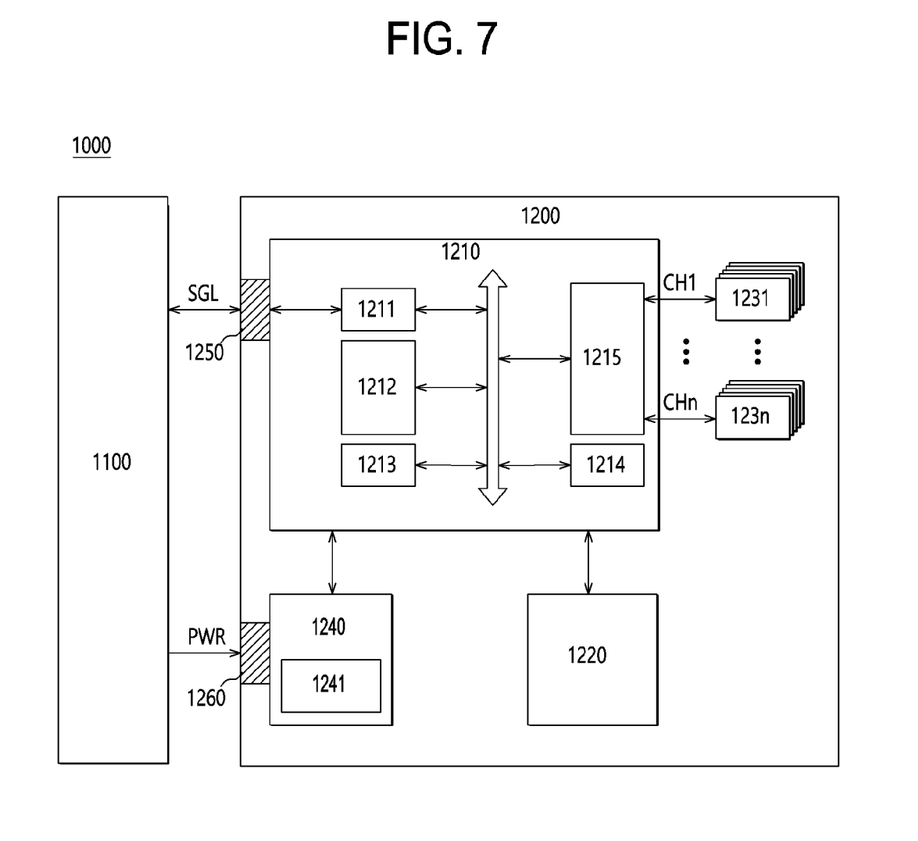
FIG. 7 is a diagram illustrating an example of a data processing system including a solid state drive (SSD) based on some embodiments of the disclosed technology.

FIG. 7 is a diagram illustrating an example of a data is processing system 1000 including a solid state drive (SSD) 1200 based on some embodiments of the disclosed technology. Referring to FIG. 7, the data processing system 1000 may include a host device 1100 and the SSD 1200. The host device 1100 may include the host device 110 shown in FIG. 1.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include the controller 121 shown in FIG. 1. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory is interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The is auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 8:
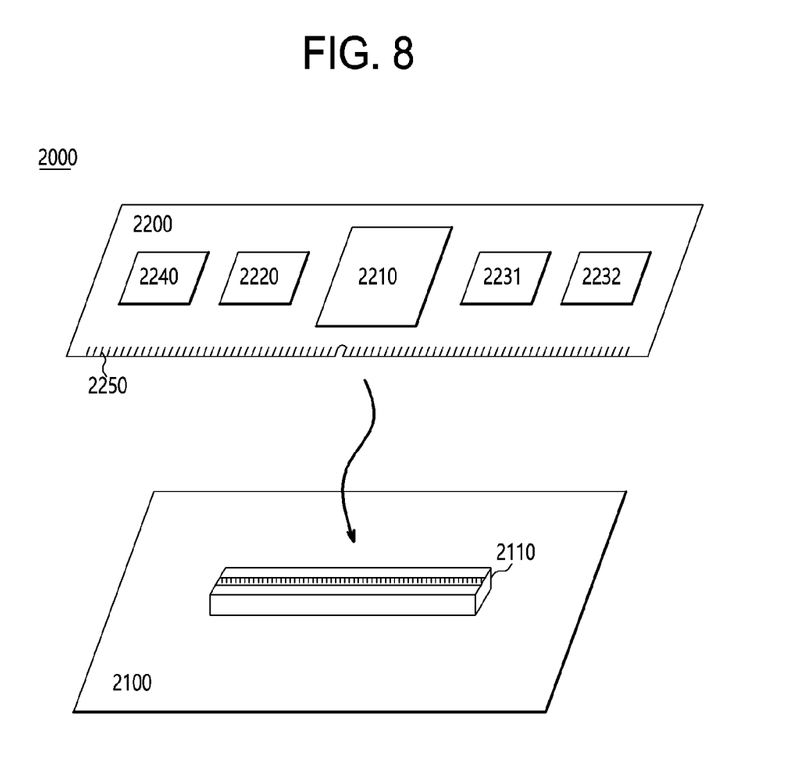
FIG. 8 is a diagram illustrating an example of a data processing system including a memory system based on some embodiments of the disclosed technology.

FIG. 8 is a diagram illustrating an example of a data processing system 2000 including a memory system 2200 based on some embodiments of the disclosed technology. Referring to FIG. 8, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 7.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 9:
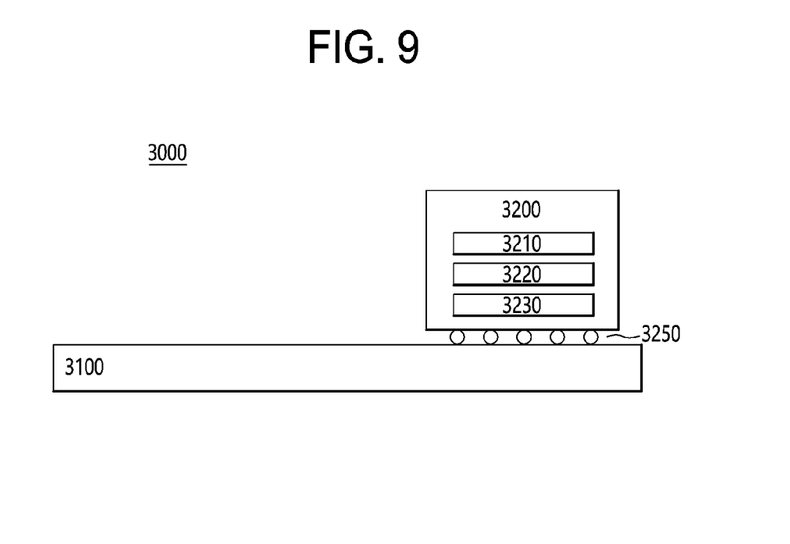
FIG. 9 is a diagram illustrating an example of a data processing system including a memory system based on some embodiments of the disclosed technology.

FIG. 9 is a diagram illustrating an example of a data processing system 3000 including a memory system 3200 based on some embodiments of the disclosed technology. Referring to FIG. 9, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 7.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 10:
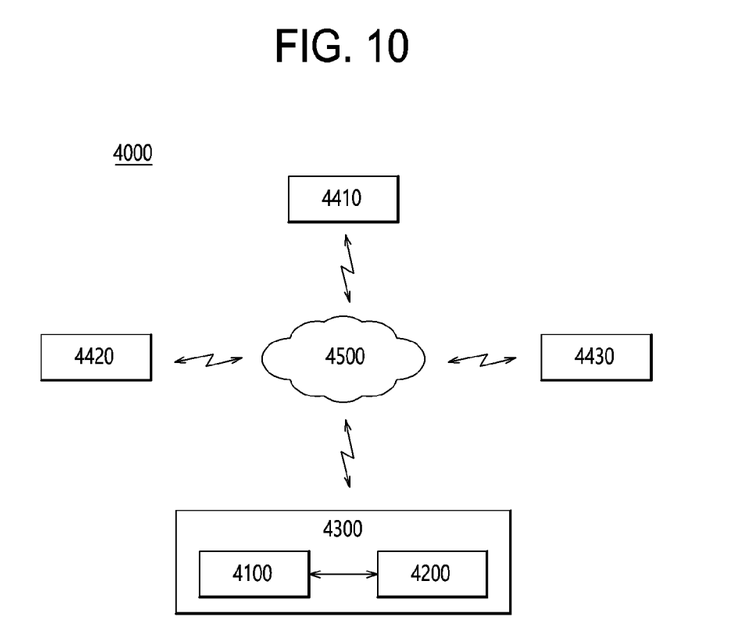
FIG. 10 is a diagram illustrating an example of a network system including a memory system based on some embodiments of the disclosed technology.

FIG. 10 is a diagram illustrating an example of a network system 4000 including a memory system 4200 based on some embodiments of the disclosed technology. Referring to FIG. 10, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 120 shown in FIG. 1, the SSD 1200 shown in FIG. 7, the memory system 2200 shown in FIG. 8 or the memory system 3200 shown in FIG. 9.

Figure 11:
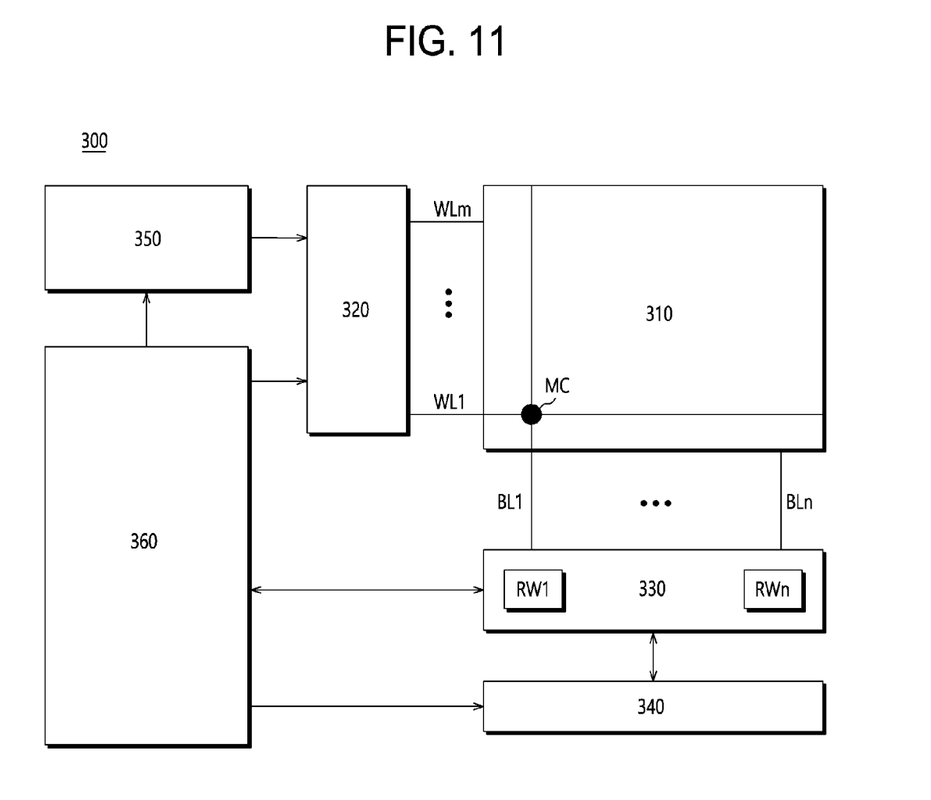
FIG. 11 is a block diagram illustrating an example of a nonvolatile memory device included in a memory system based on some embodiments of the disclosed technology.

FIG. 11 is a block diagram illustrating an example of a nonvolatile memory device 300 included in a memory system based on some embodiments of the disclosed technology. Referring to FIG. 11, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control is operations of the nonvolatile memory device 300 such as read, write and erase operations of the nonvolatile memory device 300.

While various embodiments of the disclosed technology related to a memory system, a data processing system and operations thereof have been described above, variations and enhancements of the disclosed embodiments and other embodiments may be made based on what is disclosed and/or illustrated in this patent document.

What is claimed is:

1. A memory system comprising:
    a nonvolatile memory device comprising a plurality of memory regions; and
    a controller in communication with the nonvolatile memory device to control operations of the nonvolatile memory device and configured to: receive a first write request including a first logical address and a second logical address; determine a duplicate physical address mapped to the second logical address; and selectively map the first logical address to the duplicate physical address based on a duplicate count corresponding to the duplicate physical address,
    wherein the second logical address is a logical address that is previously allocated to first data and the first logical address is a logical address that is newly allocated to the first data in addition to the second logical address.

2. The memory system according to claim 1, wherein the controller is configured to detect that whether the duplicate count is less than a threshold value, and is further configured to, when the duplicate count is detected to be less than the threshold value, increase the duplicate count and to map the first logical address to the duplicate physical address.

3. The memory system according to claim 1, wherein the controller is configured to detect that whether the duplicate count is equal to a threshold value, and, when the duplicate count is equal to a threshold value, write the first data corresponding to the first write request to a memory region selected among the memory regions, and map the first logical address to the physical address of the selected memory region.

4. The memory system according to claim 3, wherein the controller reads the first data from the memory region corresponding to the duplicate physical address, and writes, to the selected memory region, the first data read out from the memory region corresponding to the duplicate physical address.

5. The memory system according to claim 3, wherein, when storing the first data in the selected memory region, the controller stores zero value for a duplicate count corresponding to the physical address of the selected memory region.

6. The memory system according to claim 1, wherein in response to a second write request which includes the first logical address and does not include the second logical address, the controller stores second data corresponding to the second write request in a memory region selected among the memory regions, and maps the first logical address to the physical address of the selected memory region.

7. The memory system according to claim 6, wherein the controller determines a previous physical address previously mapped to the first logical address, in response to the second write request, and decreases the duplicate count corresponding to the previous physical address when a duplicate count corresponding to the previous physical address exceeds zero.

8. An operating method of a memory system, comprising:
receiving a first write request including a first logical address and a second logical address;
determining a duplicate physical address mapped to the second logical address, in response to the first write request; and
determining whether to map the first logical address to the duplicate physical address based on a duplicate count corresponding to the duplicate physical address,
wherein the second logical address is a logical address that is previously allocated to first data and the first logical address is a logical address that is newly allocated to the first data in addition to the second logical address.

9. The operating method according to claim 8, wherein determining whether to map the first logical address to the duplicate physical address includes increasing the duplicate count and mapping the first logical address to the duplicate physical address, in a case that the duplicate count is less than a threshold value.

10. The memory system according to claim 8, wherein determining whether to map the first logical address to the duplicate physical address includes writing the first data corresponding to the first write request to a memory region selected among the memory regions and mapping the first logical address to the physical address of the selected memory region, in a case that the duplicate count is equal to the threshold value.

11. The operating method according to claim 8, further comprising:
receiving a second write request including the first logical address without the second logical address; and
writing second data corresponding to the second write request to a memory region selected among the memory regions and mapping the first logical address to the physical address of the selected memory region, in response to the second write request.

12. The operating method according to claim 11, further comprising:
determining a previous physical address previously mapped to the first logical address, in response to the second write request; and
decreasing a duplicate count corresponding to the previous physical address, in a case that the duplicate count corresponding to the previous physical address exceeds zero value.

13. A data processing system comprising:
a host device configured to generate a first write request including a current logical address and a duplicate logical address, the duplicate logical address being a logical address that is previously allocated to first data and the current logical address being a logical address that is newly allocated to the first data in addition to the duplicate logical address; and
a memory system in communication with the host device to perform a memory operation in response to a request from the host device, the memory system configured to receive the first write request from the host device, determine a duplicate physical address mapped to the duplicate logical address, and selectively map the current logical address to the duplicate physical address based on a duplicate count corresponding to the duplicate physical address.

14. The data processing system according to claim 13, wherein the host device generates the first write request when copying the first data.

15. The data processing system according to claim 13, wherein in a case that the duplicate count is less than a threshold value, the memory system increases the duplicate count and maps the current logical address to the duplicate physical address.

16. The data processing system according to claim 13, wherein in a case that the duplicate count is equal to a threshold value, the memory system stores the first data corresponding to the first write request in a memory region selected among memory regions of a nonvolatile memory device, and maps the current logical address to the physical address of the selected memory region.

17. The data processing system according to claim 16, wherein the memory system reads the first data from the memory region corresponding to the duplicate physical address, and writes, to the selected memory region, the first data read out from the memory region corresponding to the duplicate physical address.

18. The data processing system according to claim 16, wherein, when storing the first data in the selected memory region, the memory system stores zero value for a duplicate count corresponding to the physical address of the selected memory region.

19. The data processing system according to claim 13, wherein in response to a second write request which includes the current logical address and does not include the duplicate logical address, the memory system stores second data corresponding to the second write request in a memory region selected among memory regions of a nonvolatile memory device, and maps the current logical address to the physical address of the selected memory region.

20. The data processing system according to claim 19, wherein the memory system determines a previous physical address previously mapped to the current logical address, in response to the second write request, and decreases the duplicate count corresponding to the previous physical address in a case that a duplicate count corresponding to the previous physical address exceeds zero value.

\* \* \* \* \*